(12) United States Patent
Caputo et al.

(10) Patent No.: US 8,539,913 B2
(45) Date of Patent: Sep. 24, 2013

(54) WEARABLE SOUND SYSTEM FOR ANIMALS

(76) Inventors: Lisa Caputo, Jamaica, NY (US);
Kristin Baggelaar, Locust Valley, NY (US)

( * ) Notice: Subject to any disclaimer, the term of this patent is extended or adjusted under 35 U.S.C. 154(b) by 251 days.

(21) Appl. No.: 12/924,553

(22) Filed: Sep. 29, 2010

(65) Prior Publication Data

US 2011/0017150 A1    Jan. 27, 2011

Related U.S. Application Data

(63) Continuation-in-part of application No. 11/901,127, filed on Sep. 14, 2007, now abandoned.

(51) Int. Cl.
*A01K 27/00* (2006.01)
*A01K 13/00* (2006.01)

(52) U.S. Cl.
USPC ............................ 119/859; 119/850; 381/182

(58) Field of Classification Search
USPC ................. 119/712, 713, 714, 718–721, 850, 119/856–859; 340/573.3; 381/301, 309, 381/311, 364, 367
See application file for complete search history.

(56) References Cited

U.S. PATENT DOCUMENTS

| | | | | |
|---|---|---|---|---|
| 4,084,139 A * | 4/1978 | Jakobe | | 381/4 |
| 4,727,599 A * | 2/1988 | Rappaport et al. | | 455/351 |
| 4,864,619 A * | 9/1989 | Spates | | 381/309 |
| 4,864,646 A * | 9/1989 | Nesbit et al. | | 455/344 |
| 4,876,724 A * | 10/1989 | Suzuki | | 381/385 |
| 5,303,426 A * | 4/1994 | Jones | | 2/181 |
| 5,438,698 A * | 8/1995 | Burton et al. | | 455/351 |
| 5,488,354 A * | 1/1996 | Bobby | | 340/576 |
| 5,749,324 A * | 5/1998 | Moore | | 119/719 |
| 5,881,390 A * | 3/1999 | Young | | 2/209.13 |
| 6,874,447 B1 * | 4/2005 | Kobett | | 119/712 |
| 6,888,950 B2 * | 5/2005 | Siskin et al. | | 381/378 |
| 8,111,859 B2 * | 2/2012 | Phillips | | 381/376 |
| 2007/0204803 A1 * | 9/2007 | Ramsay | | 119/720 |
| 2008/0144872 A1 * | 6/2008 | Phillips | | 381/333 |

* cited by examiner

*Primary Examiner* — Rob Swiatek
*Assistant Examiner* — Danielle Clerkley
(74) *Attorney, Agent, or Firm* — Adams & Wilks

(57) ABSTRACT

A wearable sound system includes an article wearable by an animal and having compartment sections, strap end portions extending from respective ones of two of the compartment sections, and a fastener that removably connects the strap end portions to one another when the article is worn by the animal. A programmable source of audible signals is located within one of the compartment sections, and two speakers are located within respective ones of the two compartment sections of the article from which the pair of strap end portions extend. Each speaker is disposed between the fastener and the programmable source and in an area disposed proximate to an ear of the animal when the article is worn by the animal so as to project a sound content of the audible signals towards an immediate vicinity of the ear of the animal in a region located forward or around the ear.

15 Claims, 10 Drawing Sheets

WEARABLE SOUND SYSTEM FOR ANIMALS

CROSS-REFERENCE TO RELATED APPLICATIONS

This application is a continuation-in-part of U.S. patent application Ser. No. 11/901,127 filed Sep. 14, 2007 now abandoned, which is herein incorporated by reference in its entirety.

BACKGROUND OF THE INVENTION

1. Field of the Invention

The present disclosure relates generally to the field of sound systems for animals and, more specifically, to wearable sound systems for training, controlling or comforting animals.

2. Background Information

In processes of training or controlling animals and, in particular, dogs, cats, or horses, it is desirable to communicate to an animal the commands and training signals at distances that exceed a range of direct voice communications, as well as be able to communicate comforting stress-relieving audible signals, such as desensitization sounds or specific music.

Presently, these goals are achieved by providing the animal with a wearable sound system having a speaker located on an animal's collar. However, in many environments characterized by high levels of inherent audible noises (for example, public gatherings, construction sites, means of mass transportation, thunderstorms, and the like), such systems have limited effectiveness.

More specifically, conventional systems for training or controlling animals have been unable to block out objectionable external sounds and provide a soothing alternative that will make any noisy or frightening environment more tolerable, such as thunderstorms, fireworks, riding in the car or airplane, kennel or even traumatic experiences such as hospitalization, post-operative recovery, new surroundings, separation anxiety, and even euthanasia. Stated otherwise, the conventional systems have not been effective in diminishing agitation and improving the quality of the animal's life.

Currently, there are several modalities that treat noise phobias in animals, including medication (tranquilizers), herbal remedies, desensitization therapy, music CDs for animals geared to soothe and calm dogs with noise phobias, and an anxiety wrap which is in the form of a garment that is worn by the animal and that targets acupressure points causing a calming effect. However, the foregoing modalities have not been proven to alleviate noise phobias.

There is therefore a need in the art for improved wearable sound systems for animals.

SUMMARY OF THE INVENTION

It is an object of the present invention to provide wearable sound systems for animals that block out objectionable external sounds and provide a soothing alternative that will make any noisy or frightening environment more tolerable, such as thunderstorms, fireworks, riding in the car or airplane, kennel or even traumatic experiences such as hospitalization, post-operative recovery, new surroundings, separation anxiety, and even euthanasia.

Another object of the present invention is to provide wearable sound systems for animals that aim to diminish agitation and improve the quality of the animal's life.

Another object of the present invention is to provide wearable sound systems for animals that provide a vehicle for targeted desensitization training which has been proven to alleviate noise phobias by bringing the sounds closer to the animal.

It is yet another object of the present invention to provide wearable sound systems for animals which can be worn for several hours in the animal's own private environment so as to accelerate the treatment time and result in a successful outcome.

It is still another object of the present invention to provide wearable sound systems for animals which can be a source of entertainment by including sounds that specifically appeal to dogs and cannot be heard by the human ear and which can improve the overall well-being of the animal as it does in humans.

Wearable sound systems for animals (for example, dogs, cats, or horses) are described herein. In one embodiment, such a system includes an article wearable by the animal, a programmable source of audible signals detachably coupled to the article, and at least two speakers. Each speaker is coupled to the article in a region proximate to an ear of the animal and adapted to project a sound content of the audible signals towards an immediate vicinity of the ear and, specifically, forward or around the ear of the animal.

In exemplary designs, the inventive sound systems comprise programmable sources of audible signals having manual or wireless controls and adapted for storing, playing, and deleting files containing commands, training signals, stress-relieving signals, or a combination thereof.

Various aspects and embodiments of the disclosure are described in further detail below.

The Summary of the Invention is neither intended nor should it be construed as being representative of the full extent and scope of the present disclosure, which these and additional aspects will become more readily apparent from the detailed description, particularly when taken together with the appended drawings.

Figure 1:
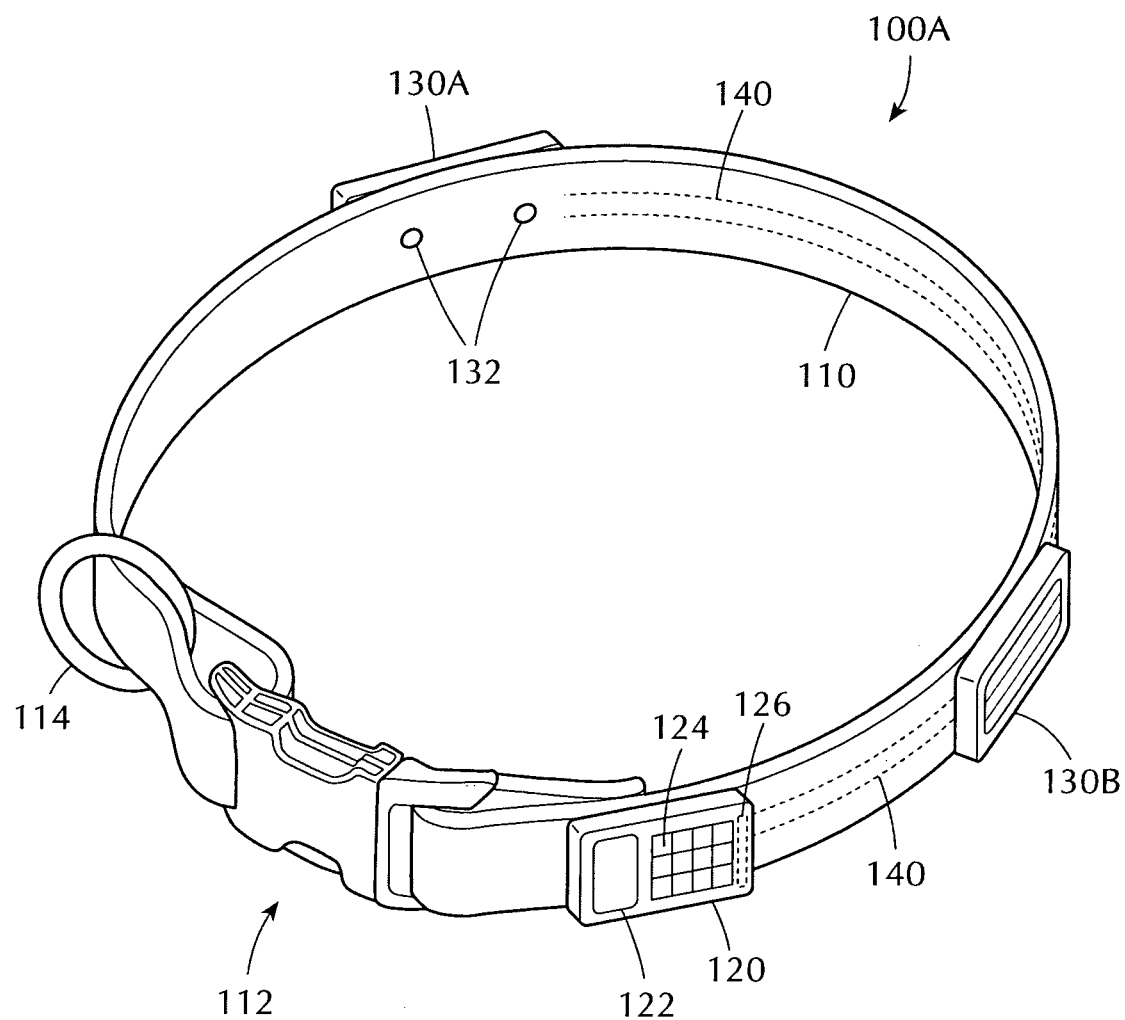
FIG. 1 is a schematic perspective view of a wearable sound system for an animal in one embodiment of the disclosure.

The images in the drawings are simplified for illustrative purposes and are not depicted to scale. To facilitate understanding, identical reference numerals have been used, where possible, to designate identical elements that are common to the figures, except that suffixes may be added, when appropriate, to differentiate such elements.

The appended drawings illustrate exemplary embodiments of the disclosure and, as such, should not be considered as limiting the scope of the disclosure that may admit to other equally effective embodiments. It is contemplated that features or steps of one embodiment may be beneficially incorporated in other embodiments without further recitation.

DETAILED DESCRIPTION OF THE PREFERRED EMBODIMENTS

The term "exemplary" is used herein to mean "serving as an example, instance, or illustration." Any embodiment or design described herein as "exemplary" or "alternative" is not necessarily to be construed as preferred or advantageous over other embodiments or designs.

Referring to the figures, FIG. 1 depicts a schematic perspective view of a wearable sound system 100A in accordance with one embodiment of the present disclosure. The system 100A generally comprises a collar 110, a programmable source 120 of audible signals, a plurality of speakers or micro/mini-speakers 130A and 130B, and a wiring network 140 (shown in phantom) coupling the speakers 130A, 130B to the programmable source 120. Hereafter, the term "speaker" is used interchangeably in reference to speakers and micro/mini-speakers.

The collar 110 is adapted for fastening around a neck of an animal such as a dog, a cat, or a horse, among other animals. Ends of the collar 110 are terminated with a latch 112, such as a buckle (as shown), a clasp, or the like fastener. In the depicted embodiment, the collar 110 also includes a retaining ring 114 adapted for connecting the collar to a leash (not shown). Conductors and terminals of the wiring network 140 are generally embedded in material(s), or lining, of the collar 110 or otherwise protected from the animal or environment.

In one embodiment, the speakers 130A and 130B are integrally affixed to the collar 110 (illustratively, using fasteners 132) and connected to the wiring network 140. Each of the speakers 130A and 130B is disposed in a region that, when the collar 110 is fastened on the animal, is located proximate to an ear of the animal, as well as adapted to project towards an immediate vicinity of the ear a sound content of the audible signals received, via the wiring network 140, from the programmable source 120. Specifically, the speakers 130A and 130B project the sound content of the audible signals in a region located forward (i.e., in front of) or around the respective ear of the animal.

In alternate embodiments (not shown), a plurality of the speakers 130A, 130B (for example, 2-6 speakers) may be disposed on the collar 110 proximate to one or both ears of the animal. Additionally or alternatively, at least some of the speakers 130A, 130B may include a protective cover or be embedded in material(s) of the collar 110.

The programmable source 120 is removably coupled to the collar 110 (for example, using, a retaining clip or a sheath (both not shown), among other fasteners) and detachably connected to the wiring network 140. In one embodiment, the programmable source 120 is disposed proximate to the latch 112 and opposite to the retaining ring 114.

The programmable source 120 is generally a digital audio component such as a digital audio player (for example, MP3 player and the like) that is adapted for storing, playing, and deleting files embodying audible signals. Typically, the audible signals comprise commands, training signals, stress-relieving signals (for example, music, recordings of an animal owner's voice, animal sounds, desensitization sounds, and the like), or a combination thereof. The respective files may be stored (for example, downloaded) in an internal memory of the programmable source 120, such as a memory chip or the like electronic memory device associated with the programmable source 120.

In one embodiment, the programmable source 120 comprises a means of manual control, including a display 122 and controls 124 (for example, a liquid crystal display (LCD) 122 and a plurality of pushbuttons or knobs 124), a battery 126 (shown in phantom), and a connector (not shown) for coupling to the wiring network 140. In operation, the battery 126, either a replaceable or re-chargeable battery, provides power to the programmable source 120 and the speakers 130A, 130B. In other embodiments (discussed below in reference to FIG. 4), alternatively or additionally, the programmable source 120 may include a means of wireless control.

Figure 2A:
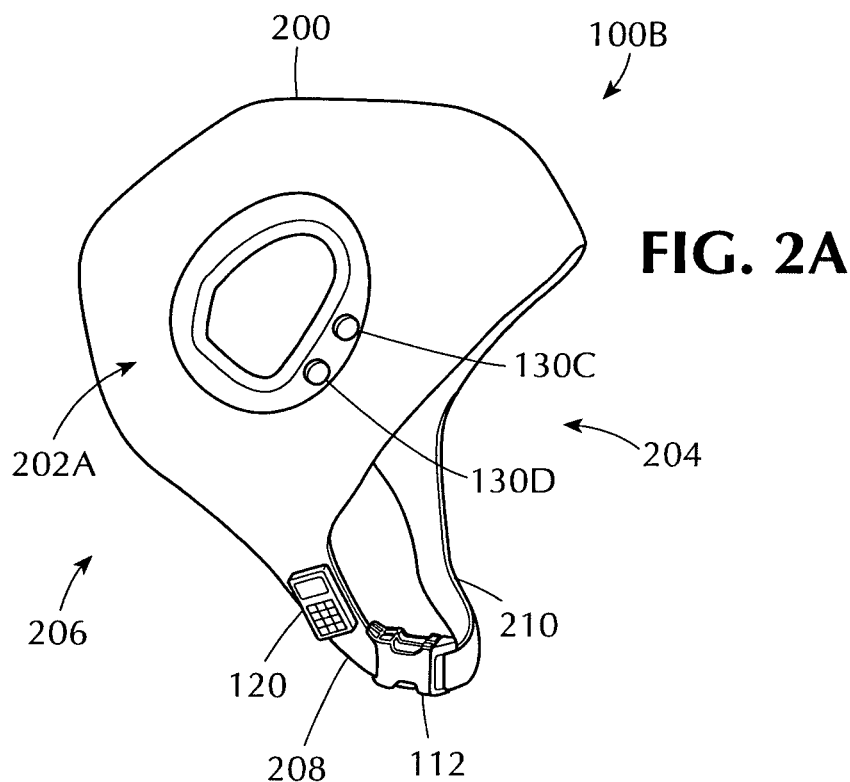
FIGS. 2A-2B are schematic perspective views of a wearable sound system for an animal in another embodiment of the disclosure.
Figure 2B:
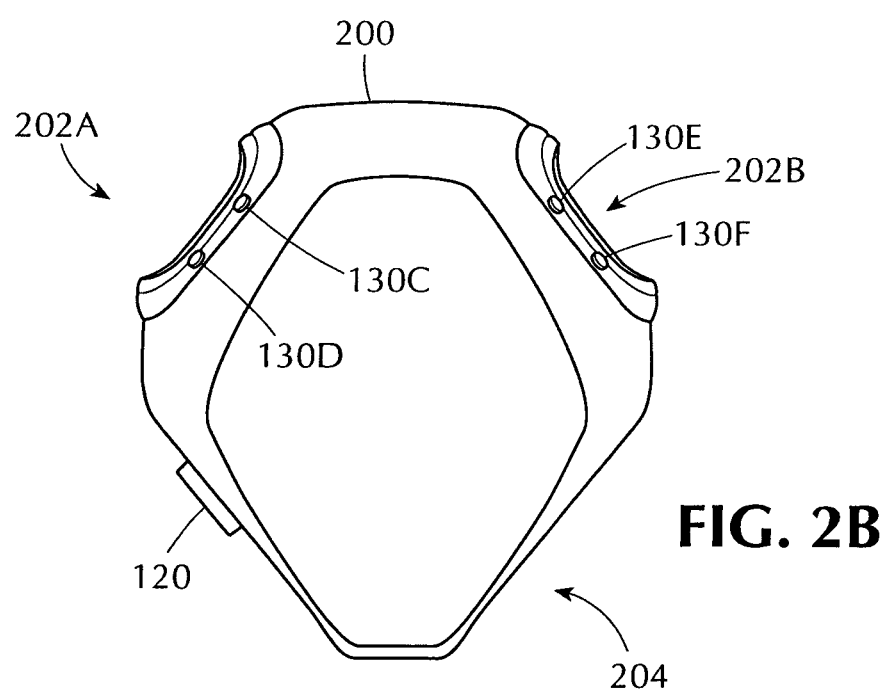
Figure 3:
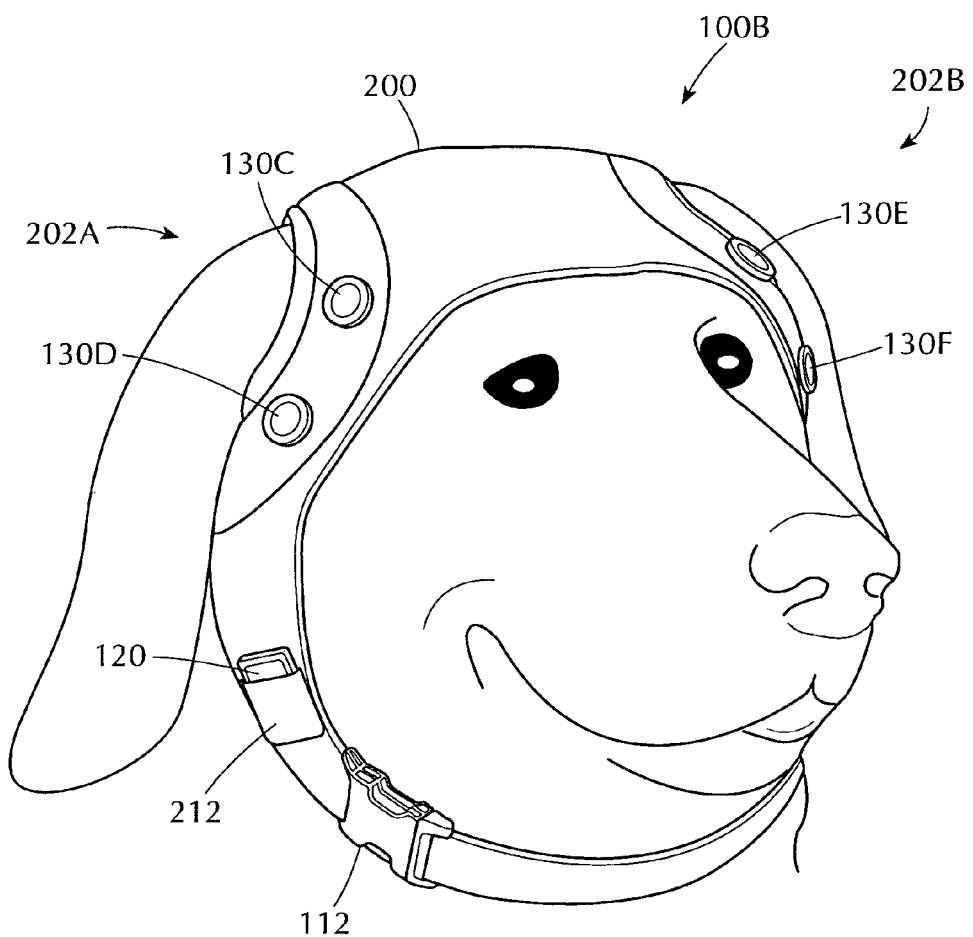
FIG. 3 is a schematic perspective view illustrating an application of the wearable sound system of FIGS. 2A-2B.

Referring to FIGS. 2A-2B and 3, in a wearable sound system 100B according to another embodiment of the disclosure, the programmable source 120, a plurality of speakers 130C-130F, and the wiring network 140 (not shown) are disposed on a hood 200 fastenable around a head of the animal.

The hood 200 has openings 202A-202B for receiving therethrough the ears of the animal, openings 204 and 206 for front and rear portions of the animal's head, respectively, and straps 208, 210 terminated with mating elements of a latch 112. In the depicted embodiment, the programmable source 120 is illustratively disposed in a sheath 212 disposed on the strap 208 in proximity to the latch 112.

Referring to FIG. 3, the speakers 130C-130F are disposed at a periphery of the openings 202A and 202B such that each of the speakers projects a sound content of the audible signals received from the programmable source 120 towards front orifices of the animal's ears, i.e., in a region located in an immediate vicinity to and forward of the respective ear of the animal. In operation, closeness of the speakers 130C-130F to the ears of the animal increases effectiveness of the wearable sound system 100B in delivering of the intended sound content and blocking out external/environmental noise or sounds.

Figure 4:
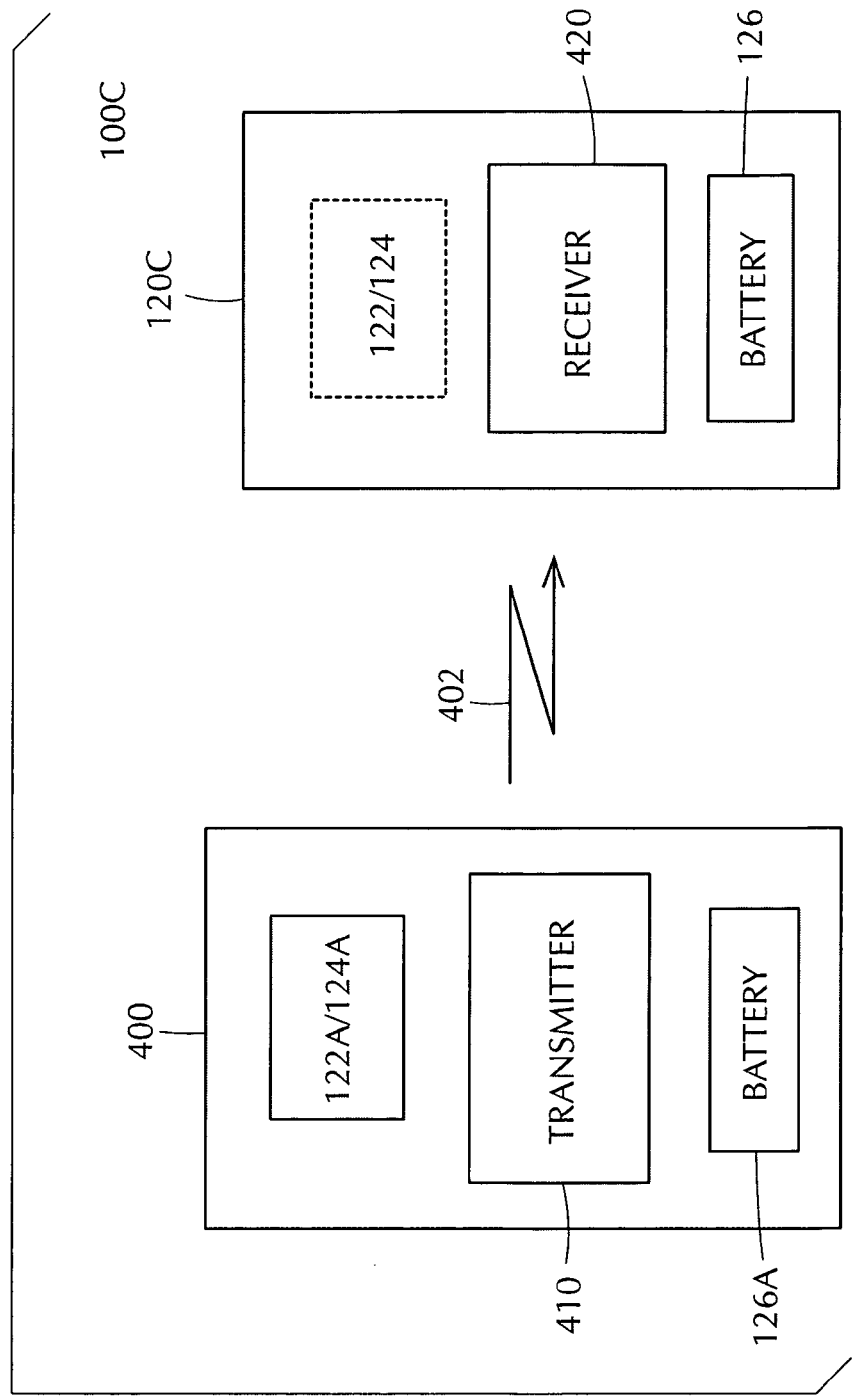
FIG. 4 is a schematic diagram of the wearable sound systems of the embodiments of the disclosure having wirelessly controlled programmable sources of audible signals.

Referring to FIG. 4, in a further embodiment, a wearable sound system 100C includes a remote controller 400 adapted to operate a programmable source 120C via a wireless communication link 402. In this embodiment, the remote controller 400 and programmable source 120C are provided with a wireless transmitter 410 and a wireless receiver 420, respectively. In operation, a user of the remote controller 400 enables, via the wireless communication link 402, functions of the programmable source 120C.

Illustratively, the remote controller 400 includes a display 122A, controls 124A, and a battery 126A that are similar to the display 122, controls 124 and battery 126 of the programmable source 120C. Alternatively, in this embodiment the programmable source 120C may, optionally, have no display, controls, or both.

Preferably, the volume of the sound content of the audible signals received from the programmable source 120C is variable and can be controlled (automatically or manually) either by one of the controls 124 on the programmable source 120C, one of the controls 124A on the remote controller 400, or both. For example, the volume of the sound content may be varied as a function of the ambient noise level experienced by the animal. As an example, the volume may be maintained at a low level during relatively quiet conditions, and elevated during relatively noisy conditions (e.g., when the dog is running, during wind and/or rain, and the like) or in many environments characterized by high levels of inherent audible noises (e.g., public gatherings, construction sites, means of mass transportation, thunderstorms, and the like). The volume controller also preferably includes a volume setting where the sound content is audible only to the animal.

Figure 5A:
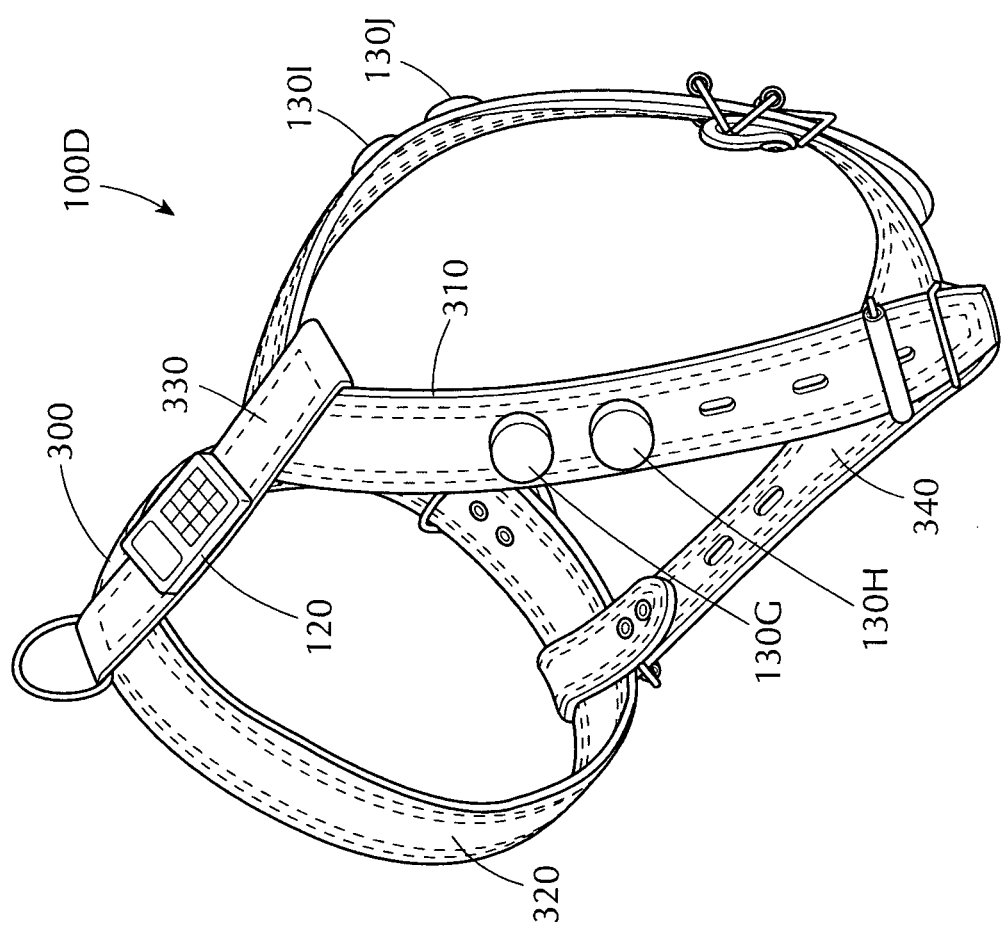
FIG. 5A is a schematic perspective view of a wearable sound system for an animal in yet another embodiment of the disclosure.
Figure 5B:
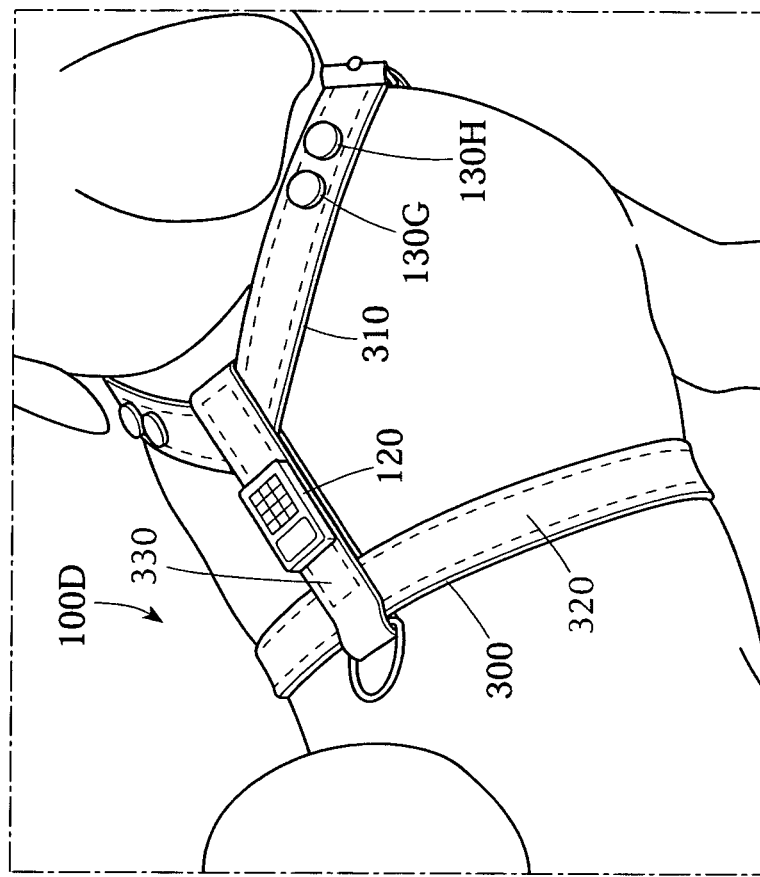
FIG. 5B is a schematic perspective view illustrating an application of the wearable sound system of FIG. 5A.

Referring to FIGS. 5A-5B, in a wearable sound system 100D according to another embodiment of the disclosure, the programmable source 120, a plurality of speakers 130G-130J, and the wiring network 140 (not shown) are disposed on a harness 300 that fits around the head and body of the animal.

The harness 300 is of conventional construction and has a first strap portion 310 that fits around the head of the animal, a second strap portion 320 that fits around a mid-section of the animal's body, and third and fourth strap portions 330, 340 interconnecting the first and second strap portions 310, 320 and that extend on upper and lower portions, respectively, of the animal's body.

In the depicted embodiment, the programmable source 120 is removably coupled to the third strap portion 330 of the harness (for example, using, a retaining clip or a sheath (both not shown), among other fasteners) and detachably connected to the wiring network 140. The speakers 130G-130J are affixed to opposite sides of the first strap portion 310 and connected to the wiring network 140. Each of the speakers 130G-130J is disposed in a region that, when the harness 300 is fastened on the animal, is located proximate to an ear of the animal, as well as adapted to project towards an immediate vicinity of the ear a sound content of the audible signals received, via the wiring network 140, from the programmable source 120. Specifically, the speakers 130G-130J project the sound content of the audible signals in a region located forward (i.e., in front of) or around the respective ear of the animal. In operation, closeness of the speakers 130G-130J to the ears of the animal increases effectiveness of the wearable sound system 100D in delivering of the intended sound content and blocking out external/environmental noise or sounds.

By the foregoing construction, since the harness 300 is securely fastened around the head and body of the animal, shifting of the first strap portion 310 of the harness 300 around the neck of the animal (e.g., during movement of the animal) is substantially restricted. As a result, during such movement of the animal, the speakers 130G-130J mounted on the first strap portion 310 will substantially remain in the desirable positions proximate to the ears of the animal, as described above.

Other features described above for the embodiments of FIGS. 1, 2A-2B, 3 and 4 are also applicable to the embodiment shown in FIGS. 5A-5B. For example, the wearable sound system of FIGS. 5A-5B may incorporate the remote controller 400 adapted to operate the programmable source 120 via the wireless communication link 402 as described above for the embodiment of FIG. 4. Additionally or alternatively, at least some of the speakers 130G-130J may include a protective cover or be embedded in material(s) of the harness 300, as set forth above for the speakers 130A, 130B and the collar 110 for the embodiment of FIG. 1.

Figure 6:
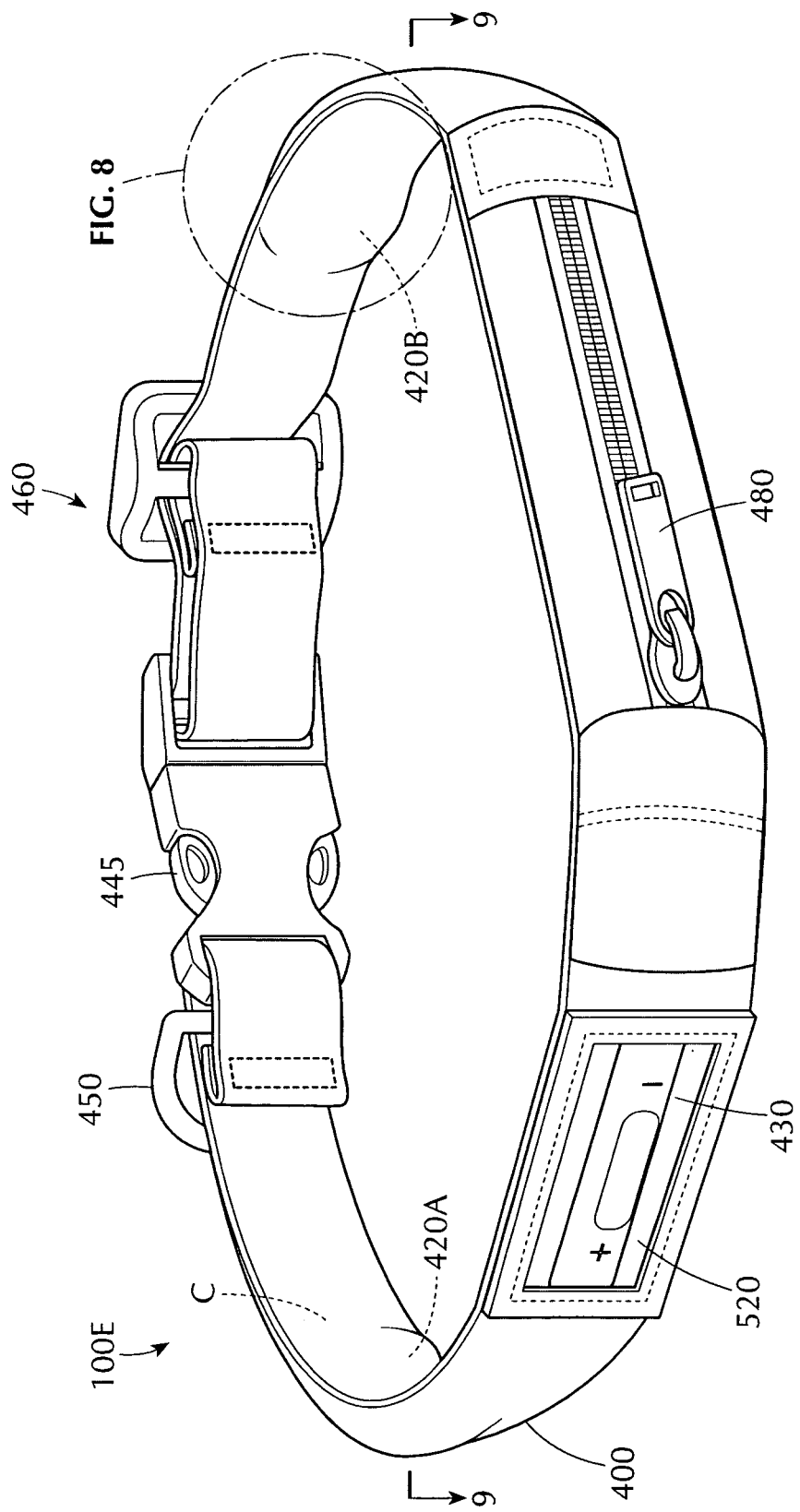
FIG. 6 is a schematic perspective view of a wearable sound system for an animal in another embodiment of the disclosure.
Figure 7:
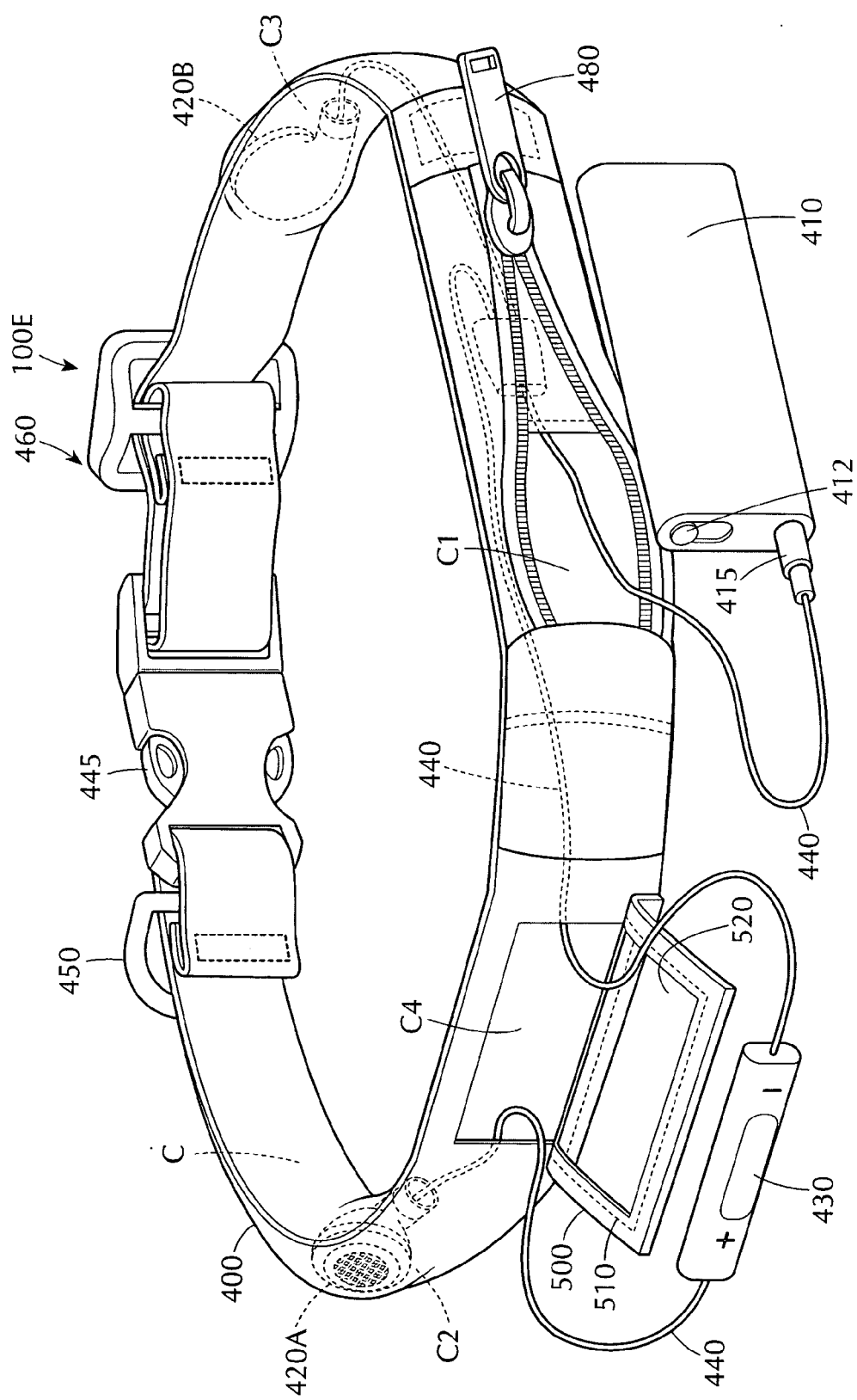
FIG. 7 is a schematic perspective view illustrating components of the wearable sound system of FIG. 6 removed from respective compartments.
Figure 8:
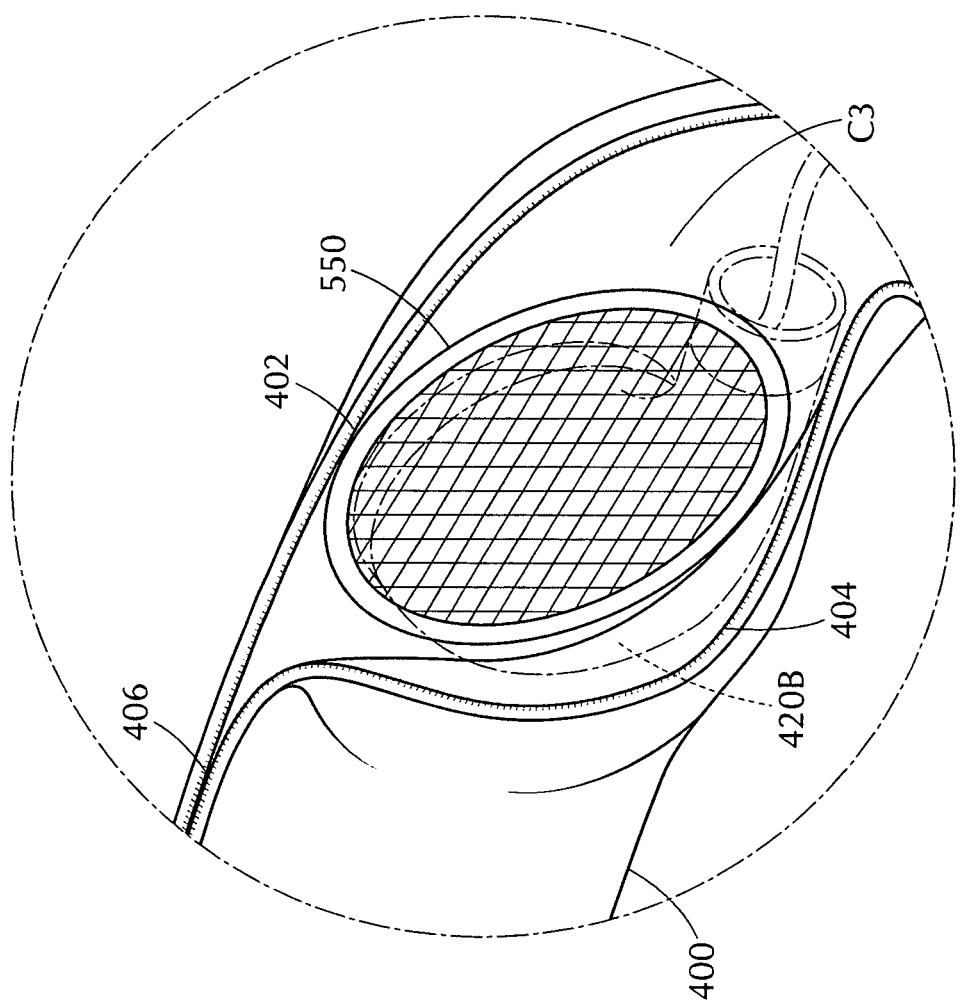
FIG. 8 is an enlarged fragmentary view of a portion of the wearable sound system in FIG. 6 showing one of the speakers in a modification of the embodiment shown in FIGS. 6-7.

FIGS. 6-8 show another embodiment of the wearable sound system, generally designated at 100E, according to the present disclosure. The system 100E comprises a collar 400, a programmable source 410 of audible signals, a plurality of speakers or micro/mini-speakers 420A and 420B, a volume control 430, and a wiring network 440 coupling the speakers 420A, 420B to the programmable source 410 via the volume control 430. The programmable source 410 is removably connected/disconnected from the wiring network via a connector (e.g., headphone jack) 415.

The collar 400 is adapted for fastening around a neck of an animal such as a dog, a cat, or a horse, among other animals, as set forth above for the collar shown in FIG. 1. Ends of the collar 400 are terminated with a latch 445, such as a buckle (as shown), a clasp, or the like fastener. In the depicted embodiment, the collar 400 also includes a retaining ring 450 adapted for connecting the collar to a leash (not shown), and an adjustable strap mechanism, generally designated at 460, for adjusting the length of the collar 400 to accommodate various animal neck sizes.

As best shown in FIGS. 7-8, the collar 400 has a tubular construction forming a main compartment C for accommodating or embedding therein the programmable source 410, the speakers, 420A, 420B, the volume control 430, and the wiring network 440. The collar 400 is made of a strip of material, such as nylon, that is folded about a generally central portion thereof and peripheral edges 402, 404 are sewn together along a stitch line 406, as shown in FIG. 8, to provide the tubular construction. In this embodiment, the main compartment C provides compartment sections C1, C2-C3 and C4 for accommodating the programmable source 410, the speakers 420A-420B and the Volume control 430, respectively. The wiring network 440 passes through the various compartment sections C1-C4 to couple the speakers 420A, 420B to the programmable source 410 via the volume control 430. FIG. 7 shows the various compartment sections C1-C4 and corresponding components of the system, with the programmable source 410, volume control 430 and portions of the wiring network 440 being removed from the respective compartment sections and with the speakers 420A, 420B being shown in phantom and disposed within their respective compartment sections.

It is understood by those skilled in the art that the collar 400 is not limited to the foregoing form of tubular construction. For example, instead of one strip, the collar 400 may be formed of two or more strips of material that are connected together along peripheral edges thereof to provide the collar with a tubular construction. Additionally, the form of connection of the peripheral edges to provide the tubular construction is not limited to stitching, but may be a connection using a suitable adhesive or a combination of stitching and an adhesive, for example.

Referring to FIGS. 7-8, a portion of the collar 400 is associated with a zipper or like closure 480 to provide access into the compartment section C1 and from which the programmable source 410, speakers 420A, 420B, volume control 430 and wiring network 440 can be inserted into and/or removed from the main compartment of the collar 400. For example, opening the closure 480 from the state shown in FIG. 6 to the state shown in FIG. 7 provides access to a manual control 412 (e.g., power ON/OFF) for controlling operation of the programmable source 410. Likewise, in the open state shown in FIG. 7, the programmable source 410 can be removed from the compartment section C1 and replaced with another programmable source by disconnecting the connector 415 from the programmable source 410. It is understood that the closure 480 is not limited to a zipper as shown in FIGS. 6-7, and that other types of closures, including snap- and VELCRO-type closures, are suitable.

The volume control 430 provides for volume up/down control for the programmable source 410. The volume control 430 is visible and operable through a display window 500 that is connected to one of the exterior sides of the collar 400 along connecting lines 510 via stitching, an adhesive, a combination of stitching and an adhesive, or via other suitable forms of connection, such as VELCRO. When connected to the exterior side of the collar 400, the display window 500 covers an opening (not shown) formed in the collar 400 to provide access to the compartment section C4 of the main compartment C.

As best shown in FIG. 6, the display window 500 has a transparent window portion 520 displaying the volume control 430 within the compartment section C4. The transparent window portion 520 is made of a suitable transparent material, such as glass or plastic. The volume control 430 is positioned in the compartment section C1 and visible via the transparent window portion 520 so as to allow operation of the various functions of the volume control 430 (e.g., volume, play, pause and ON/OFF control of the programmable source 410) to be performed by pressing corresponding buttons via the transparent window portion 520.

As shown in FIG. 7, the speakers 420A and 420B are positioned within compartment sections C2 and C3, respectively, and connected to the wiring network 440. Each of the speakers 420A and 420B is disposed in a region that, when the collar 400 is fastened on the animal, is located proximate to an ear of the animal, as well as adapted to project towards an immediate vicinity of the ear a sound content of the audible signals received, via the wiring network 440, from the programmable source 410. Specifically, the speakers 420A and 420B, via respective sound grills integral with the speakers 420A, 420B, project the sound content of the audible signals in a region located forward (i.e., in front of) or around the respective ear of the animal. It is understood that the present invention is not limited to the particular speakers described herein, and that any other type of speakers or any other means for projecting the sound content generated by the programmable source 410 as described herein is also suitable.

In the embodiment shown in FIGS. 6-7, the speakers 420A, 420B, via the respective sound grills, project the sound content through portions of the material from which the collar 400 is formed and that confront the respective sound grills of the speakers 420A, 420B. Thus in this embodiment, the collar 400 is preferably made of a material (e.g., nylon) that permits the sound content to sufficiently project from the speakers 420A, 420B and through the material of the collar 400 so as to allow the sound content to project towards an immediate vicinity of the animal's ears as set forth above.

FIG. 8 shows a modification to the embodiment of FIGS. 6-7 in which the portions of the collar 400 that confront the respective sound grills of the speakers 420A, 420B are directly provided with respective perforated screens 550. By this construction, the sound content projecting from the speakers 420A, 420B through the collar 400 can be amplified. This is particularly beneficial when the material selected for the collar 400 is such that the amplification of the sound content projected form the speakers 420A, 420B is decreased as it projects through the collar 400. Thus the perforated screens 550 in this modified embodiment increases the types of materials that can be used for the collar 400 since the material itself is not limited to the types of materials that permits the sound content to sufficiently project from the speakers 420A, 420B. In fact, the material itself for the collar 400 in this modified embodiment need not be of the type capable of projecting the sound content from the speakers 420A, 420B at all since the projection of the sound content from the speakers 420A, 420B will be directly through the perforated screens 550 provided to the collar 400 at the respective portions thereof confronting the sound grills of the speakers 420A, 420B. The provision of the perforated screens 550 to the collar 400 may be accomplished in an manner recognized by those skilled in the art. For example, the perforated screens 550 may be formed of a suitable plastic or fabric material and attached to the collar 400 via stitching, an adhesive, a combination of stitching and an adhesive, or via other suitable forms of connection.

In alternate embodiments (not shown), a plurality of the speakers 420A, 420B (for example, 4-6 speakers) may be disposed within multiple compartment sections in the tubular collar 400. In these embodiments, the plurality of speakers are positioned as set forth above to project the sound content of the audible signals in a region located forward (i.e., in front of) or around the respective ear of the animal. Additionally, the collar 400 may be provided with or without the perforated screens 550 as set forth above for the foregoing embodiments.

In the embodiment shown in FIGS. 6-7, the programmable source 410 is disposed generally opposite to the latch 445, retaining ring 450, and adjustable strap mechanism 460. The programmable source 410 is generally a digital audio component such as a digital audio player (for example, MP3 player and the like) that is adapted for storing, playing, and deleting files embodying audible signals. Typically, the audible signals comprise commands, training signals, stress-relieving signals (for example, music, recordings of an animal owner's voice, animal sounds, desensitization sounds, and the like), or a combination thereof. The respective files may be stored (for example, downloaded) in an internal memory of the programmable source 410, such as a memory chip or the like electronic memory device associated with the programmable source 410. The programmable source 440 is removably coupled to the wiring network 140 via the connector 415 and comprises a means of manual control, including the control 412 (e.g., power ON/OFF) and components that are not shown for simplicity purposes (e.g., display, battery, etc.). In operation, a battery (not shown), either a replaceable or re-chargeable battery, provides power to the programmable source 410 and the speakers 420A, 420B. In other embodiments (discussed below in reference to FIG. 4), alternatively or additionally, the programmable source 120 may include a means of wireless control.

It will be appreciated from the foregoing embodiments shown in FIGS. 6-8 that all of the components for generating and projecting the sound content, including the programmable source 410, speakers 420A, 420B, volume control 430, and wiring network 440, are embedded or completely enclosed with the main compartment of the tubular collar 400. This feature can be particularly appreciated from FIG. 6 which shows the wearable sound system 100E ready for use. By this construction, these components of the wearable sound system 100E can be protected from the animal or environment.

Additionally, from the state shown in FIG. 6, the closure 480 permits access to the compartment section C1, as shown in FIG. 7, to allow the programmable source 410 to be programmed, or the components for generating and projecting sound to be removed for maintenance and/or replacement as necessary. During use, however, the construction of the wearable sound system 100E does not require access into the compartment sections C1-C4 via the closure 480 or otherwise, as the components for generating and projecting sound can be controlled via control of the volume control 430 through the transparent window 520 as set forth above.

Figure 9:
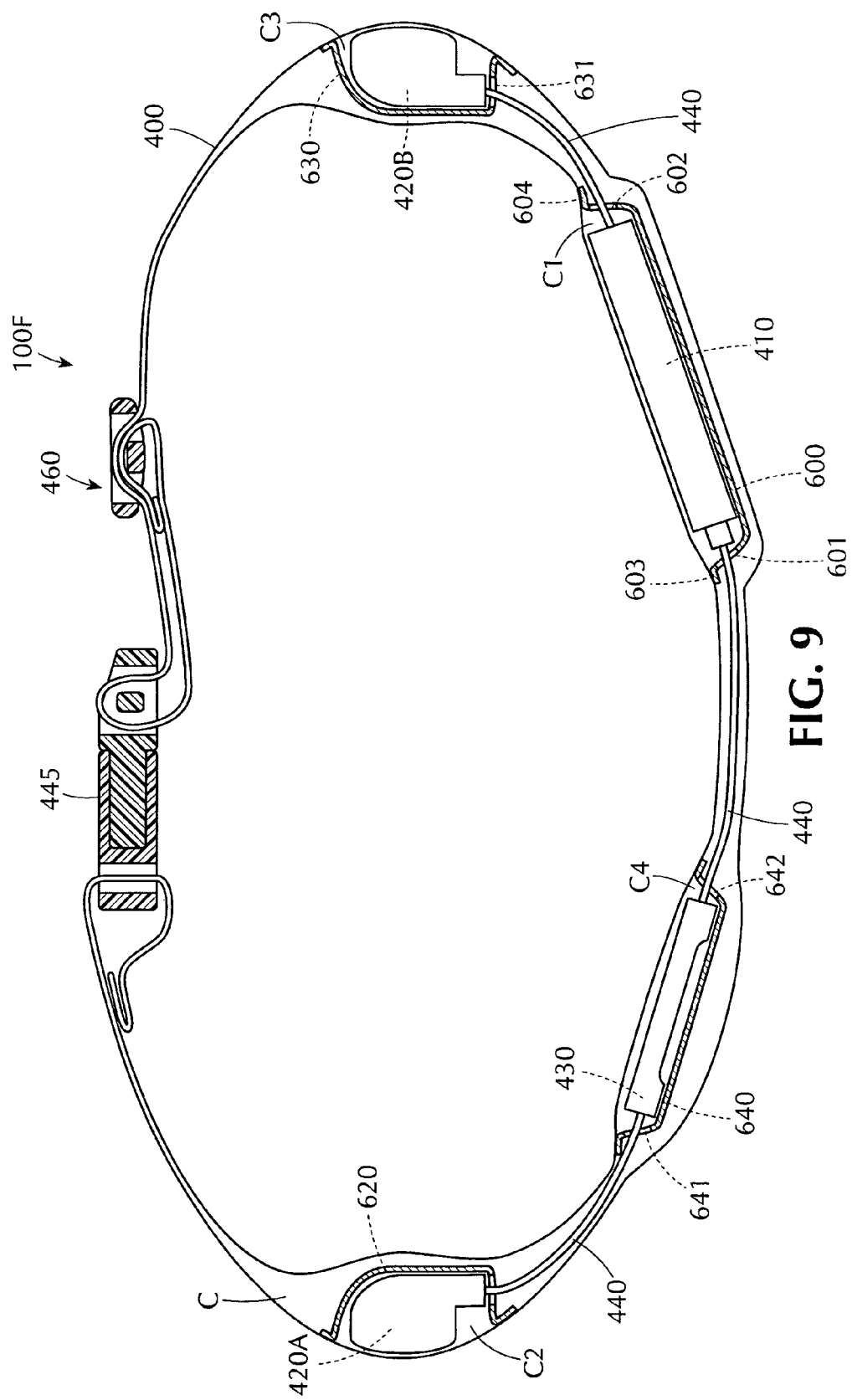
FIG. 9 is a partial sectional view taken in the direction of line 9-9 of FIG. 6 and illustrating another modified form of the wearable sound system shown in FIGS. 6-7.

FIG. 9 is a sectional view taken in the direction of line 9-9 of FIG. 6 and illustrates another modified form of the wearable sound system, generally designated at 100F. In addition to the features described above for the embodiments of FIGS. 6-8, in the embodiment of FIG. 9 the interior of the collar 400 is provided with enclosure members 600, 620, 630, 640 that physically enclose and separate the respective compartment sections C1-C4 from the main compartment C. The enclosure members 600, 620, 630, 640 provide for more accurate positioning of the programmable source 410, speakers 420A, 420B and volume control 430 within the respective compartment sections C1-C4 to prevent these components from shifting within the main compartment C during use or handling of the wearable sound system 100F. By this construction, the collar 400 provides plural compartment sections within the main compartment, and the enclosure members 600, 620, 630, 640 define means for positioning and enclosing the programmable source 410, speakers 420A, 420B and volume control 430 to prevent substantial movement or shifting of these components within the main compartment C.

The enclosure members 600, 620, 630 and 640 may be formed of the same material as that used for the collar 400, or other suitable material. The enclosure members 600, 620, 630 and 640 are formed with respective openings 601-602, 621-622, 631-632, 641-642, respectively, to permit passage therethrough of the wiring network 440. The enclosure members 600, 620, 630 and 640 may be integrally connected to respective interior surface portions of the collar 400 by stitching, glue, a combination of stitching and glue, or other suitable form of connection. Alternatively, the enclosure members 600, 620, 630 and 640 may be removably connected to the respective interior surface portions of the collar 400, such as by VELCRO connectors. Preferably, the enclosure member 600 is removably connected to the corresponding interior portions of the collar 400 along marginal side portions 603, 604 via removable connectors, such as VELCRO. By this construction, when the closure 480 is opened in the state shown in FIG. 7, the enclosure member 600 can be removed to provide access to the programmable source 410 as set forth above, and thereafter reconnected to the interior of the collar 400 to enclose and position the programmable source 410 within the compartment section C1. Additionally, the enclosure member 640 is provided with an opening (not shown) that confronts the transparent window portion 520 (FIG. 6) to permit the volume control 430 to be viewed through the transparent window portion 520 in the state of the wearable sound system shown in FIG. 6.

It will be appreciated by those skilled in the art that in the foregoing embodiments, the collar, the harness, and the hood constitute supporting means for removably supporting the programmable source and for supporting the speakers in areas disposed proximate to the ears of the animal so that the speakers project a sound content of the audible signals from the programmable source toward an immediate vicinity of the ears of the animal in a region located forward or around the ears. It will be understood, however, that the mounting means is not limited to a collar, a harness, or a hood, but may instead be any other type of article wearable by the animal, including ear muffs or any type of article of clothing wearable by the animal that can support the programmable source and speakers as set forth above.

By delivering the intended pre-programmed sounds to ears of an animal using a plurality of selectively disposed speakers, the wearable digital sound systems of the present disclosure provide efficient means for training or controlling of the animal. In other applications, the disclosed systems may be used in veterinary practice for implementing therapeutic procedures directed towards soothing or desensitization of the animal, as well as a form of entertainment for the animal.

Referring to some applications involving dogs, such systems may be used to teach the dogs obedience, calm excessive barkers or nervous dogs, decrease stress or agitation, or provide training for operating/behaving in environments having specific noise patterns (for example, during traveling on a plane or a railroad car). It is understood by those skilled in the art, however, that the systems disclosed herein are not limited to applications involving dogs, but may be also used with other animals, such as cats and horses.

Thus the present disclosure provides embodiments of wearable sound systems for animals that block out objectionable external sounds and provide a soothing alternative that will make any noisy or frightening environment more tolerable, such as thunderstorms, fireworks, riding in the car or airplane, kennel or even traumatic experiences such as hospitalization, post-operative recovery, new surroundings, separation anxiety, and even euthanasia. The wearable sound systems for animals of the present disclosure aim to diminish agitation and improve the quality of the animal's life by providing a vehicle for targeted desensitization training which has been proven to alleviate noise phobias by bringing the sounds closer to the animal. The wearable sound systems for animals of the present disclosure can be worn for several hours in the animal's own private environment which can aid to accelerate the treatment time and result in a successful outcome. The wearable sound systems for animals of the present disclosure can be a source of entertainment by including sounds that specifically appeal to dogs and cannot be heard by the human ear and can improve the overall well-being of the animal as it does in humans.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A wearable sound system for an animal, comprising:
an article wearable by the animal in the vicinity of the animal's head, the article having a tubular construction forming a main compartment having a plurality of compartment sections, a pair of strap end portions extending from respective ones of two of the compartment sections, and a fastener that removably connects the pair of strap end portions to one another when the article is worn by the animal;
a programmable source of audible signals located within one of the compartment sections of the article; a closure accessible from an exterior surface of the article for permitting access to the compartment section in which the programmable source is located to allow the programmable source to be inserted into and/or removed from the compartment section from the exterior of the article while the article is worn by the animal; and
at least two speakers located respectively within the two compartment sections of the article from which the pair of strap end portions extend, each speaker being disposed between the fastener and the programmable source and being coupled to the article in an area disposed proximate to an ear of the animal when the article is worn by the animal so as to project a sound content of the audible signals from the programmable source towards an immediate vicinity of the ear of the animal in a region located forward or around the ear.

2. A wearable sound system according to claim 1; wherein the article is a collar fastenable around a neck of the animal.

3. A wearable sound system according to claim 1; wherein the programmable source of audible signals is coupled to the speakers using wires embedded in the article wearable by the animal.

4. A wearable sound system according to claim 1; wherein the programmable source of audible signals is coupled to the speakers and a volume control using wires, the volume control being located within one of the plurality of compartment sections of the article within which the programmable source and the at least two speakers are not located.

5. A wearable sound system according to claim 4; further comprising a plurality of enclosure members that physically enclose and separate the respective compartment sections from the main compartment.

6. A wearable sound system according to claim 1; wherein the programmable source of audible signals includes at least one of: a manual control for the programmable source and a wireless control of the programmable source.

7. A wearable sound system according to claim 6; further comprising a remote controller adapted to operate the programmable source of audible signals via a wireless communication link.

8. A wearable sound system according to claim 1; wherein the programmable source of audible signals comprises a digital source of audible signals.

9. A wearable sound system according to claim 1; wherein the audible signals comprise commands, training signals, stress-relieving signals, or a combination thereof.

10. A wearable sound system according to claim 1; wherein each of the at least two speakers has a sound grill confronting a respective portion of the article that is directly provided with a perforated screen so that a sound content projecting from the at least two speakers is amplified to the exterior of the article via the perforated screen.

11. A wearable sound system according to claim 1; wherein the article comprises a collar fastenable by the fastener around the neck of the animal, the collar being substantially tubular in construction forming the main compartment having the compartment sections and having enclosure members that physically enclose and separate respective ones of the compartment sections from the main compartment.

12. A wearable sound system for an animal, comprising:
a programmable source of audible signals;
at least two speakers;
an article wearable by the animal for removably supporting the programmable source and the at least two speakers, the article including a main tubular compartment having a plurality of compartment sections in which respective ones of the programmable source and two of the speakers are located, and including a closure accessible from an exterior surface of the article for permitting access to the compartment section in which the programmable source is located to allow the programmable source to be inserted into and/or removed from the compartment section from the exterior of the article while the collar is worn by the animal; and
a fastener for removably fastening the article on the animal's body in the vicinity of the animal's head so that each of the two speakers is positioned in an area disposed proximate to an ear of the animal so as to allow the two speakers to project a sound content of the audible signals from the programmable source toward an immediate vicinity of the ear of the animal in a region located forward or around the ear, each of the two speakers being disposed between the fastener and the programmable source.

13. A wearable sound system according to claim 12; wherein the article comprises a collar having a tubular construction forming the main tubular compartment having the compartment sections, the collar being fastenable by the fastener around a neck of the animal.

14. A wearable sound system according to claim 12; wherein the article comprises a collar fastenable around the neck of the animal; and wherein each of the two speakers has a sound grill confronting a respective portion of the collar that is directly provided with a perforated screen so that a sound content projecting from the two speakers is amplified to the exterior of the collar via the perforated screen.

15. A wearable sound system according to claim 12; wherein the article comprises a collar fastenable by the fastener around the neck of the animal, the collar being tubular in construction forming the main tubular compartment having the compartment sections, the collar having enclosure members that physically enclose and separate respective ones of the compartment sections from the main tubular compartment, and the collar having a pair of strap end portions extending from respective ones of the compartment sections in which the two speakers are located; and wherein the fastener removably connects the pair of strap end portions to one another to position the collar around the neck of the animal.

* * * * *